(12) United States Patent
Lin

(10) Patent No.: US 6,742,729 B2
(45) Date of Patent: Jun. 1, 2004

(54) AIR JET TYPE LINEAR GUIDE WAY

(75) Inventor: Ming-Yuan Lin, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 10/235,743

(22) Filed: Sep. 6, 2002

(65) Prior Publication Data

US 2004/0046068 A1 Mar. 11, 2004

(51) Int. Cl.[7] .................................................. B05B 1/14
(52) U.S. Cl. ........................................ 239/590; 384/15
(58) Field of Search ................................. 239/590, 592, 239/593, 594, 398, 590.3, 590.5, 261, 264, 143; 384/15

(56) References Cited

U.S. PATENT DOCUMENTS

| | | | | |
|---|---|---|---|---|
| 4,707,879 A | * | 11/1987 | Moszkowski | 15/345 |
| 5,494,354 A | * | 2/1996 | Tsukada | 384/13 |
| 5,547,285 A | * | 8/1996 | Hutzel et al. | 384/15 |
| 6,443,619 B1 | * | 9/2002 | Dutsch | 384/45 |
| 6,572,269 B2 | * | 6/2003 | Yabe et al. | 384/15 |
| 6,581,429 B1 | * | 6/2003 | Takakura et al. | 72/236 |
| 6,592,261 B2 | * | 7/2003 | Mochizuki | 384/45 |

* cited by examiner

Primary Examiner—Michael Mar
Assistant Examiner—Thach H Bui
(74) Attorney, Agent, or Firm—Rosenberg, Klein & Lee

(57) ABSTRACT

An air jet type linear guide way contains an air chamber in the sliding block for injecting pressurized air therefrom along the track way so as to forcibly blow junks such as wastes, powder dust, or oil scales away before passing of the slide block assembly therefore no fear of infringement of contaminative foreign materials into the main structure of the linear guide way assembly that causes severe injury to its performance. The device of this invention will be well-suited for using in high contaminated working environments such as carpentry, stone cutting, or textiles and dyeing engineering where powder dusts are usually pervading in the air.

4 Claims, 5 Drawing Sheets

AIR JET TYPE LINEAR GUIDE WAY

BACKGROUND OF THE INVENTION

1. Field of the Invention

The present invention relates to an air jet type linear guide way, and in particular, to a linear guide way equipped with a dust removal air jet chamber capable of excluding foreign materials such as wastes, powder dust or oil deposits remain along the guide track so that the linear guide way of the present invention is well-fitted to use in high dusty workshops such as carpentry, stone cutting, or textiles and dyeing.

2. Description of the Prior Art

FIG. 7 shows a fragmentary cross sectional view of a conventional linear guide way. It comprises a sliding track 10, a sliding block 20, and two end covers 30. Each end cover 30 further contains a cover body 76, a plurality of rollers 5b, and a scrapper 40. Each end cover 30 together with its cover body 76 and scrapper 40 are tightened to both ends of the sliding block 20 by a tie bolt 6b. The sliding track 10 and the sliding block 20 are mounted on their respective rolling grooves. The roller 5b is circulating between the two grooves of the sliding block 20 and the sliding track 10 so as to minimize the frictional resistance caused by relative motion of the sliding block 20 with respect to the sliding track 10. The end covers 30 at both ends of the sliding block 20 serve to turn direction of the moving assembly. When the sliding block 20 moves on the sliding track 10, the roller 5b rolls along the rolling grooves between the sliding block 20 and the sliding track 10 and reaches a circulation hole (not shown) of the sliding block 20 via the end cover 30, and then rolls from the circulation hole to the other side end cover 30 and returns to the rolling grooves between the sliding block 20 and the sliding track 10 thereby completing one circulation. The scrapper 40 is important for removing those foreign materials such as wastes, powder dust or oil deposits remain along the path of the sliding block 20 so as to keep the sliding track 10 always clean thereby ensuring operation of the linear guide way as smooth as possible.

Particularly, to the linear guide way employed in precision machine, demand of dust-proof effect for the linear guide way becomes more and more urgent that only scraping those foreign materials attached to the linear guide way away passively using the scrapper does not meet with the requirement of present day. The sizes and contours of the sliding track and the scrapper shall be closely matched so as to expect a desired satisfactory dust removal effect. If the matching of the two parts is too snug, powder dust can not be cleared thoroughly. But on the other hand, if the two parts are matched too tight, the scrapper will be badly abraded very soon so that its lifetime will be shortened. A relevant solution compromising between these two opposite factors shall be worked out for the sake of achieving purpose of upgrading dust removal effect the linear guide way.

In view of the foregoing situation, the inventor of the invention herein conducted intensive research based on many years of experience gained through professional engagement in the manufacturing of related products with continuous experimentation and improvement culminating in the development of the ingeniously designed air jet type linear guide way capable of fulfilling aforesaid object.

SUMMARY OF THE INVENTION

Therefore, the main object of the present invention is to provide an air jet type linear guide way which has means capable of removing the foreign materials such as wastes, powder dust or oil deposits remained along the guide track actively and thoroughly instead of only preventing those junks from infringing into the guide track, and by doing so, to make the device well-fitted to working in highly contaminated environments.

For achieving the aforementioned object, the present invention provides an air chamber in the sliding block for injecting pressurized air therefrom along the track way so as to forcibly remove those junks away before passing of the slide block assembly. Certainly, there is no fear of infringement of contaminative foreign materials into the main structure of the linear guide way assembly that causes severe damage to its performance.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE PREFERRED EMBODIMENTS

Figure 1:
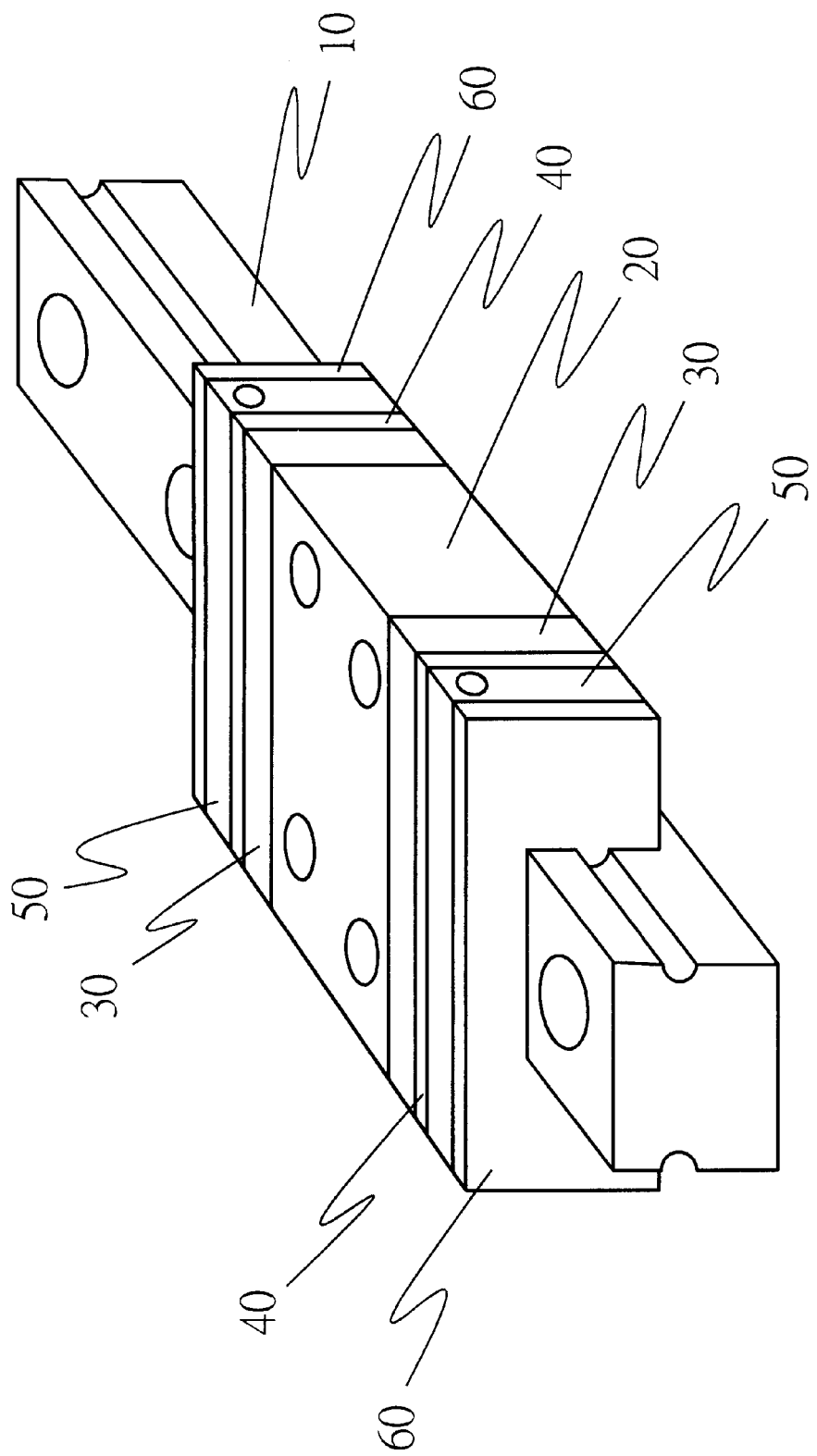
FIG. 1 is a three dimensional view of the air jet type linear guide way according to the present invention.

FIG. 1 is a three dimensional view of the air jet type linear guide way according to the present invention. The air jet type linear guide way of the present invention is composed of a sliding track 10 associated with a sliding block assembly, and a plurality of rollers (not shown) interposed therebetween. The sliding block assembly includes a sliding block 20, two end covers 30, two scrappers 40, two air guide blocks 50, and two lids 60. An air chamber 56 (see FIG. 2) is formed in each inner confined cavity of air guide block 50, and the air can be guided and injected out proportionally along the contour of the sliding track 10.

Figure 2:
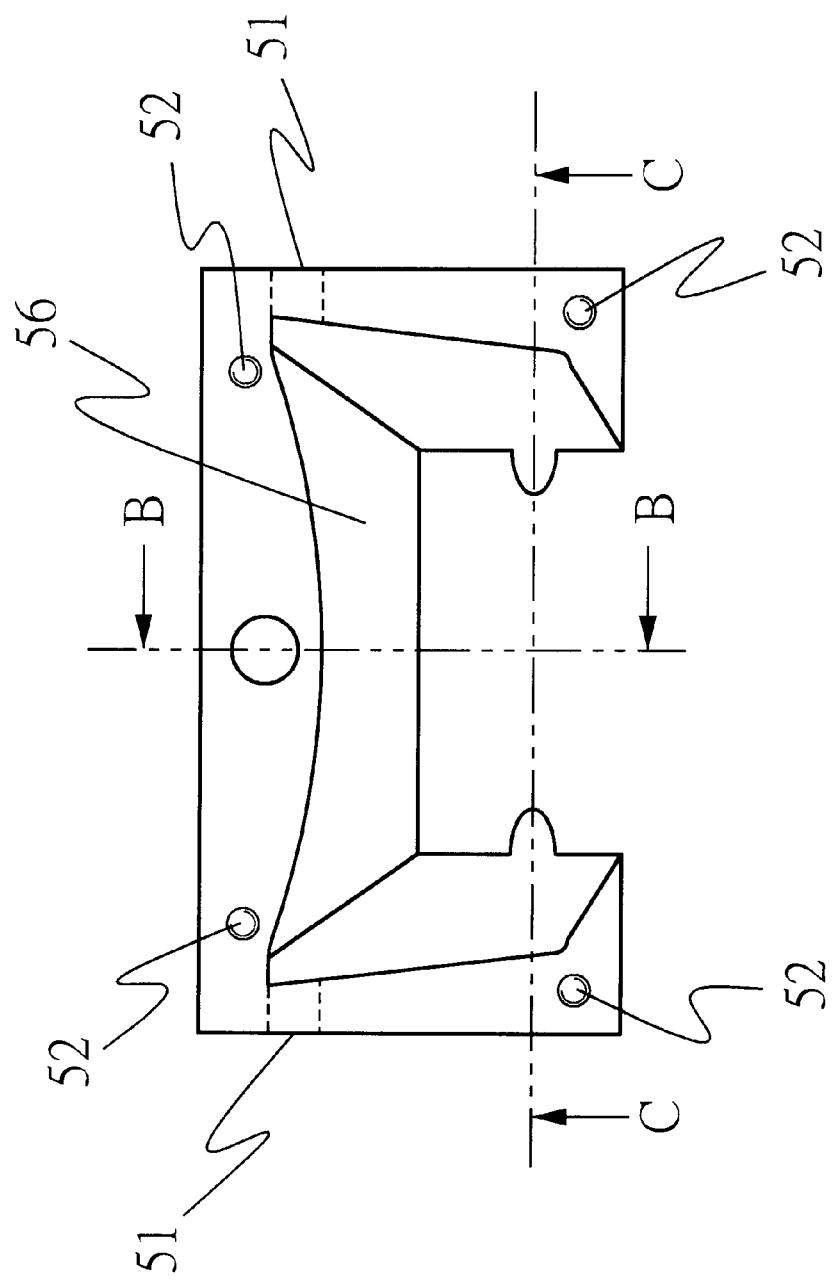
FIG. 2 is a front view of the air guide block shown in FIG. 1.
Figure 6:
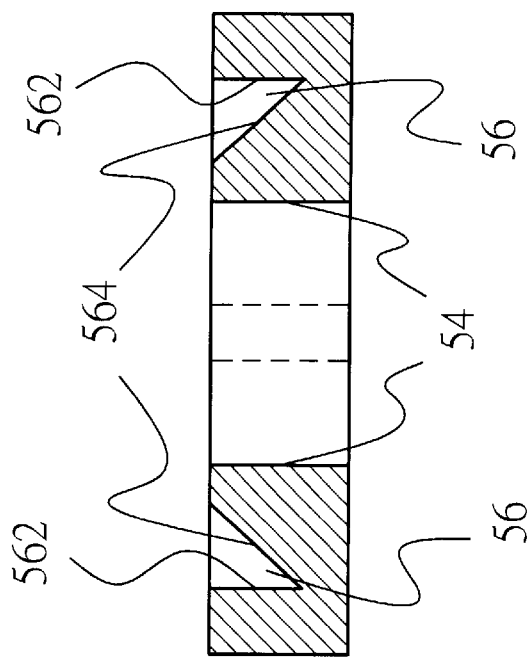
FIG. 6 is a cross sectional view of FIG. 2 cut along line C—C.
Figure 5:
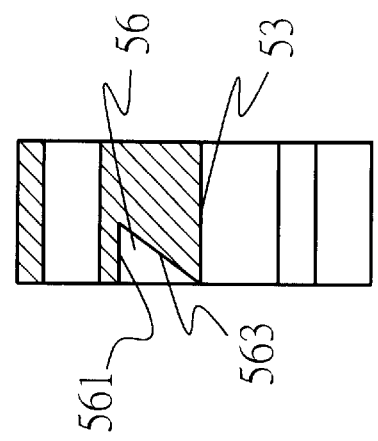
FIG. 5 is a cross sectional view of FIG. 2 cut along line B—B.
Figure 3:
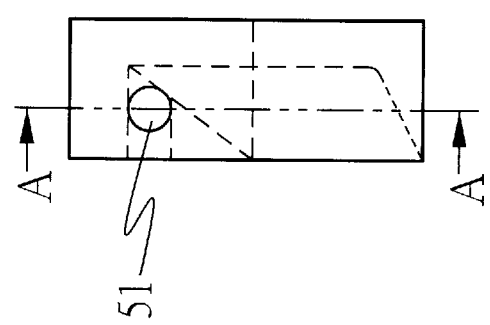
FIG. 3 is a side view of the air guide block shown in FIG. 2.
Figure 4:
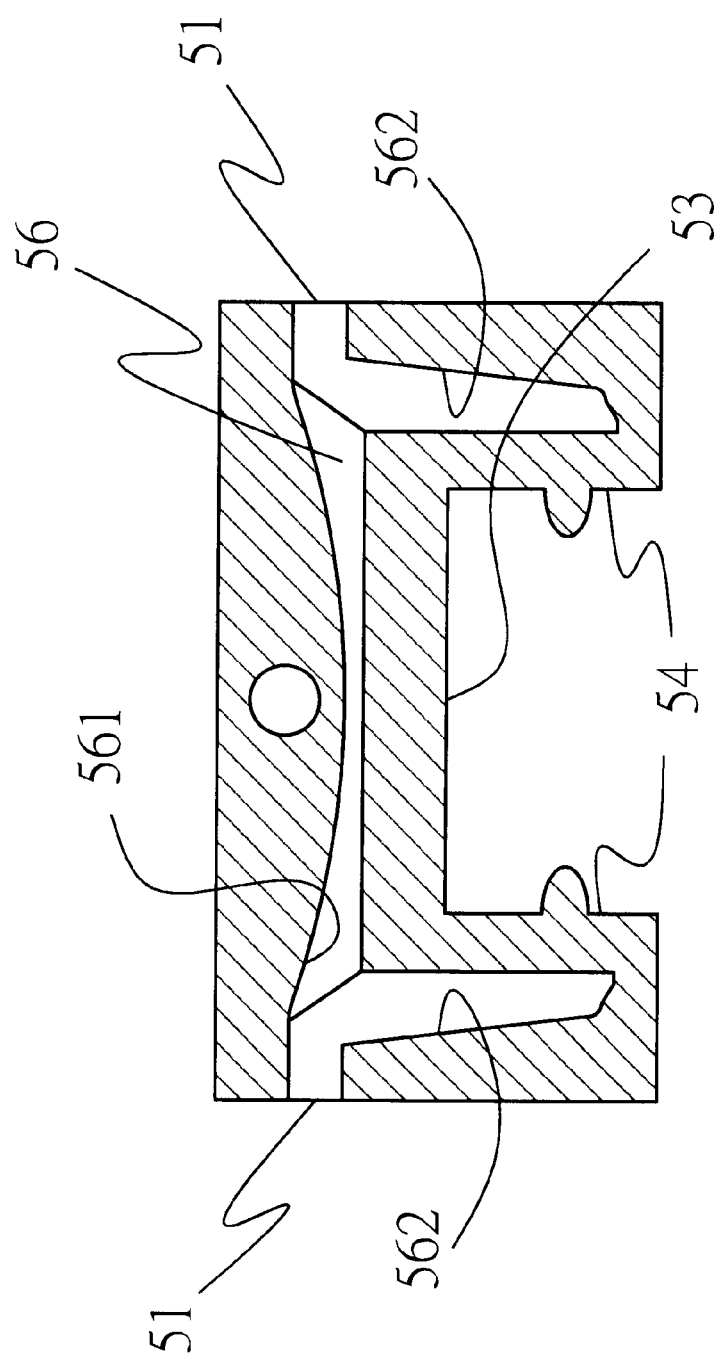
FIG. 4 is a cross sectional view of FIG. 3 cut along line A—A.
Figure 7:
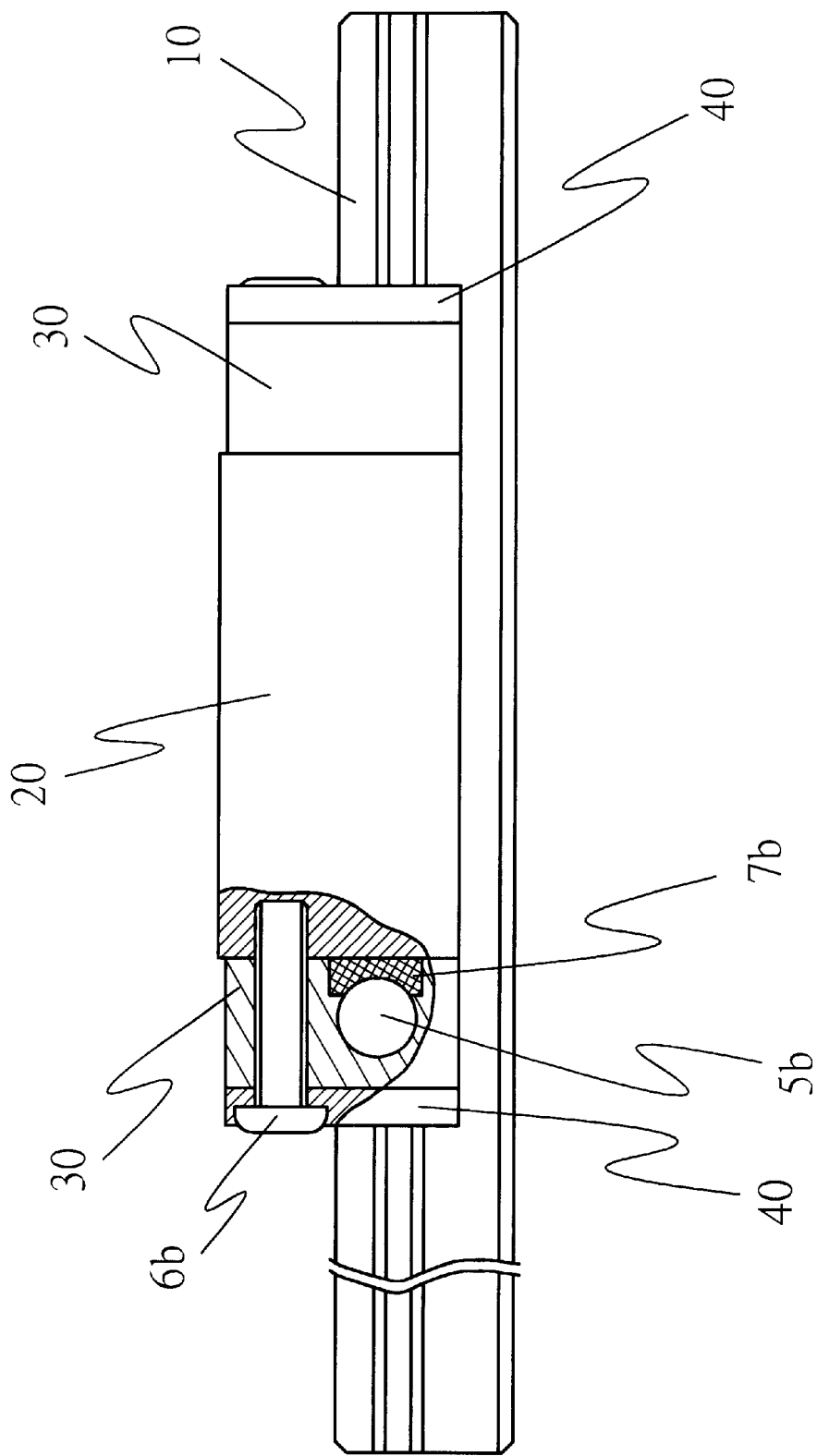
FIG. 7 is a fragmentary cross sectional view of a conventional linear guide way.

For fuller understanding working principle of the present invention, reference should be made to FIGS. 2, 3 and 4. FIG. 2 is a front view of the air guide block shown in FIG. 1, FIG. 3 is a side view of the air guide block shown in FIG. 2, and FIG. 4 is a cross sectional view of FIG. 3 cut along line A—A. As shown in these drawings, the lid 60 is bolted tightly to the air guide block 50 through four tapped holes 52 provided at four corners thereof. An air inlet 51 is formed at each side of the air guide block 50 for introducing air to the air chamber 56. Referring further to FIGS. 5 and 6 together with FIGS. 2, 3 and 4 to understand more detailedly the unique construction of the air guide block 50 and the air chamber 56 involved in it. The air chamber 56 is encircled by an upper flow guide planar surface 561 (FIG. 5), two side flow guide planar surfaces 562 (FIG. 6), an upper flow guide tilted planar surface 563 (FIG. 5), and two side flow guide tilted planar surfaces 564 (FIG. 6). By cooperated guide function of these surfaces 561, 562, 563 and 564, air introduced into this confined cavity of the air chamber 56 is compressed and pressurized. This pressurized air is then injected out of the air chamber 56 as an air jet stream along the contour of the slide track 10 via an injection opening 54, 54 so as to forcibly blow away all kinds of dust deposited along the sliding track 10 in order to reach dust free function. Meanwhile, the lid 60 of the air guide block 50 is made of a metallic material to ensure its rigidity.

It is understood from the above description that the air jet type linear guide way of the present invention has several advantages over any product fabricated by conventional techniques, namely:

1. Actively blowing away all kinds of dust thoroughly cleans up the route of the linear guide way, as a result, there is no more worry about machine break-down due to infringement of dust.
2. The lifetime of the equipment is prolonged which leads to cutting down the investment.
3. The air jet type linear guide way will be well-suited for using in high contaminated working environments such as carpentry, stone cutting, or textiles and dyeing engineering.

Those who are skilled in the art will readily perceive how to modify the invention. Therefore, the appended claims are to be construed to cover all equivalent structures which fall within the true scope and spirit of the invention.

What is claimed is:

1. A linear guide way comprising:

an elongate sliding track having parallel rolling grooves provided at two sides thereof;

a sliding block assembly for sliding on said sliding track, said sliding block assembly being provided with a rolling groove engagement portion corresponding to each rolling groove of said sliding track, and a circulation pathway for rollers;

a plurality of rollers rolling and circulating between said corresponding rolling grooves of said sliding track and rolling groove engagement portions of said sliding block;

said sliding block assembly defining an inner air chamber about at least a portion of an outer contour of said sliding track, said air chamber having an inlet for permitting air to be injected therein, said air chamber being configured for guiding the injected air along said sliding track, whereby substantially dust free operation is maintained.

2. The type linear guide way of claim 1, wherein the sliding block assembly includes an air guiding block, and said air chamber forms an inner confined cavity of said air guiding block for guiding and expelling the injected air out proportionally along the contour of said sliding track.

3. The type linear guide way of claim 2, wherein a lid is provided for said air guide block, said confined cavity of the air guide block being defined by said lid and said air guide block.

4. The type linear guide way of claim 3, wherein said lid is made of a metallic material.

* * * * *